(12) United States Patent
Zhang

(10) Patent No.: US 8,667,143 B2
(45) Date of Patent: Mar. 4, 2014

(54) METHOD AND SYSTEM FOR REDIRECTING A CLIENT

(75) Inventor: Tao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 11/880,346

(22) Filed: Jul. 20, 2007

(65) Prior Publication Data

US 2007/0271354 A1 Nov. 22, 2007

Related U.S. Application Data

(63) Continuation of application No. PCT/CN2006/001836, filed on Jul. 25, 2006.

(30) Foreign Application Priority Data

Nov. 10, 2005 (CN) .......................... 2005 1 0115885

(51) Int. Cl.
*G06F 15/16* (2006.01)

(52) U.S. Cl.
USPC ........................................................ 709/227

(58) Field of Classification Search
USPC ......... 709/217–219, 221, 238, 203, 245, 102, 709/226–229; 726/8; 370/230, 256, 400; 703/3
See application file for complete search history.

(56) References Cited

U.S. PATENT DOCUMENTS

| | | | | |
|---|---|---|---|---|
| 5,644,720 | A * | 7/1997 | Boll et al. ...................... | 709/227 |
| 6,768,743 | B1 | 7/2004 | Borella et al. | |
| 6,799,214 | B1 * | 9/2004 | Li ................................. | 709/226 |
| 6,829,473 | B2 * | 12/2004 | Raman et al. ................. | 455/406 |
| 6,915,345 | B1 * | 7/2005 | Tummala et al. ............. | 709/225 |
| 6,954,456 | B2 * | 10/2005 | Cranor et al. ................. | 370/356 |
| 7,080,158 | B1 * | 7/2006 | Squire .......................... | 709/245 |
| 7,103,640 | B1 * | 9/2006 | Overton et al. ............... | 709/217 |

(Continued)

FOREIGN PATENT DOCUMENTS

| | | |
|---|---|---|
| CN | 1538706 | 10/2004 |
| CN | 1581114 | 2/2005 |
| WO | 01/80003 | 10/2001 |

OTHER PUBLICATIONS

Liu et al. "Introduction to Diameter—Get the next Generation AAA Protocol." IBM—United States. Jan. 24, 2006. Web. Aug. 4, 2010. <http://www.ibm.com/developerworks/library/wi-diameter/index.html>.*

(Continued)

*Primary Examiner* — Imad Hussain

(74) *Attorney, Agent, or Firm* — Conley Rose, P.C.; Grant Rodolph; Nicholas K. Beaulieu

(57) ABSTRACT

A method and a system for redirecting a client are disclosed, the method including: sending by the client a request message to a redirect agent; returning by the redirect agent a first response message to the client, an identification of a second realm being carried in the first response message; sending by the client the request message to a second server in the second realm. The data are maintained and modified only on the redirect agent, so that the redirection service between different realms may be realized without upgrading or maintaining the client. In addition, because the number of redirect agents is much smaller than the number of clients, the operation and maintenance costs may be reduced greatly.

15 Claims, 5 Drawing Sheets

(56) References Cited

U.S. PATENT DOCUMENTS

| | | | |
|---|---|---|---|
| 7,266,100 B2* | 9/2007 | Le et al. | 370/331 |
| 7,284,055 B1* | 10/2007 | Oehrke et al. | 709/226 |
| 7,392,325 B2* | 6/2008 | Grove et al. | 709/238 |
| 7,509,422 B2* | 3/2009 | Jaffray et al. | 709/226 |
| 7,624,184 B1* | 11/2009 | Aviani et al. | 709/227 |
| 7,647,424 B2* | 1/2010 | Kim et al. | 709/238 |
| 7,761,500 B1* | 7/2010 | Eckert et al. | 709/203 |
| 2002/0002622 A1* | 1/2002 | Vange et al. | 709/245 |
| 2002/0069241 A1* | 6/2002 | Narlikar et al. | 709/203 |
| 2003/0076841 A1 | 4/2003 | Boxall et al. | |
| 2003/0112792 A1* | 6/2003 | Cranor et al. | 370/352 |
| 2003/0177162 A1* | 9/2003 | Staiger et al. | 709/102 |
| 2003/0177274 A1* | 9/2003 | Sun | 709/310 |
| 2004/0230831 A1* | 11/2004 | Spelman et al. | 713/201 |
| 2005/0088971 A1* | 4/2005 | Qing et al. | 370/230 |
| 2005/0235065 A1* | 10/2005 | Le et al. | 709/238 |
| 2006/0067338 A1* | 3/2006 | Hua et al. | 370/400 |
| 2006/0077926 A1* | 4/2006 | Rune | 370/328 |
| 2006/0153135 A1* | 7/2006 | Ascolese et al. | 370/331 |
| 2006/0242320 A1* | 10/2006 | Nettle et al. | 709/245 |
| 2007/0118667 A1* | 5/2007 | McCarthy et al. | 709/238 |
| 2007/0283026 A1* | 12/2007 | Lohmar et al. | 709/229 |
| 2008/0288458 A1* | 11/2008 | Sun et al. | 707/3 |
| 2009/0019106 A1* | 1/2009 | Loupia | 709/203 |
| 2012/0177028 A1* | 7/2012 | Mo et al. | 370/351 |

OTHER PUBLICATIONS

"Introduction to Diameter." Hewlett-Packard Company, 2002. Web.*

Gupta, S.; Narasimha Reddy, A.L.; , "A client oriented, IP level redirection mechanism," INFOCOM '99. Eighteenth Annual Joint Conference of the IEEE Computer and Communications Societies. Proceedings. IEEE , vol. 3, No., pp. 1461-1469 vol. 3, Mar. 21-25, 1999.*

Baggio, A.; van Steen, M.; , "Transparent distributed redirection of HTTP requests," Network Computing and Applications, 2003. NCA 2003. Second IEEE International Symposium on , vol., No., pp. 17-24, Apr. 16-18, 2003.*

Suryanarayanan, K.; Christensen, K.J.; , "Performance evaluation of new methods of automatic redirection for load balancing of Apache servers distributed in the Internet," Local Computer Networks, 2000. LCN 2000. Proceedings. 25th Annual IEEE Conference on , vol., No., pp. 644-651, 2000.*

Cardellini, V.; Colajanni, M.; Yu, P.S.; , "Redirection algorithms for load sharing in distributed Web-server systems," Distributed Computing Systems, 1999. Proceedings. 19th IEEE International Conference on , vol., No., pp. 528-535, 1999.*

Tsou, T. et al. "Realm-Based Redirection in Diameter". Internet Engineering Task Force. Jul. 14, 2009. pp. 1-5.*

Calhoun, P. et al. RFC 3588: "Diameter Base Protocol". Internet Engineering Task Force. Sep. 2003. pp. 1-147.*

English abstract of CN 1581114 dated Feb. 16, 2005.

English abstract of CN 1538706 dated Oct. 20, 2004.

5 SIP IP , *China Data Communications* (2004) No. 2, pp. 102-107 [Partial English translation of 4.1.4 and 5.2].

Written Opinion of the International Searching Authority (translation) dated (mailed) Nov. 23, 2006, issued in related Application No. PCT/CN2006/001836, filed Jul. 25, 2006, Huawei Technologies Co., Ltd.

First Chinese Office Action dated (mailed) Jan. 9, 2009, issued in related Chinese Application No. 200680011789.4 Huawei Technologies Co., LTD.

Rejection Decision of Chinese Application No. 200680011789.4 mailed Aug. 21, 2009, Huawei Technologies Co., LTD.

Notification of Reexamination of Chinese Application No. 200680011789.4, mailed Dec. 9, 2010, Huawei Technologies Co., LTD.

Zhao Zhifeng et al, "IP Telephony System and Call Routing Part V Call Routing of SIP IP Telephony System," China Data Communications Feb. 2004.

European Patent Office Communication pursuant to Article 94(3) EPC; mailing date of Jul. 19, 2011, in reference to Application No. 06761566.6-1244 for Huawei Technologies Co., Ltd., (4 pgs.).

Translation of Reexamination Decision of Chinese Application No. 200680011789.4; mailing date of Feb. 17, 2011, (8 pgs.).

* cited by examiner

METHOD AND SYSTEM FOR REDIRECTING A CLIENT

CROSS-REFERENCES TO RELATED APPLICATIONS

The present application is a continuation of PCT Application No. PCT/CN2006/001836, filed on Jul. 25, 2006, which claims a priority to Chinese Patent Application No. 200510115885.0, filed on Nov. 10, 2005. All of these applications are incorporated herein by reference for all purposes.

FIELD OF THE INVENTION

The present invention relates to communication field, and more particularly to a method and a system for redirecting a client.

BACKGROUND OF THE INVENTION

In communication field, "AAA" refers to Authentication, Authorization and Accounting. From the birth of communication networks, the authentication, authorization and accounting mechanism has become the foundation for operation of the communication networks. The use of various resources in the networks has to be managed through authentication, authorization and accounting. For a commercial system, authentication is vital, because the exact person who should be charged for service provision can be ascertained and illegal users (hackers) can be prevented from attacking the network only when the user's identity is confirmed. After the user's identity is confirmed, the system can grant the user corresponding authority according to the service category requested by the user when the user opens his/her account. Finally, when the user uses resources of the system, an appropriate device is required to perform statistics on the user's occupation of resources, and charge the user according to the statistics. In existing schemes, operators set an appropriate server for clients to perform the above management.

In practical management, due to various reasons, there often occur cases in which a client requires changing the server assigned for it by the system. At present, Diameter protocol is employed to handle related server changes and assign a different server for the client, i.e., to perform a redirection operation. Diameter messages can be routed via a Redirect Agent. In Diameter protocol, Remote Authentication Dial In User Service (RADIUS) can be translated into a new generation of AAA protocol, i.e., RADIUS*2=Diameter. In Diameter protocol, there are defined relevant Network Elements (NEs), including client, server and agent.

FIG. 1 shows a process of client redirection. As shown in FIG. 1, the redirection process mainly includes the steps as follows.

In Step S01, a client sends a request message to a redirect agent.

In Step S02, the redirect agent returns a response message to the client to tell the address of a redirected server.

For example, the content of a redirect response message for authorization and authentication is as follows:
 <AAA>::=<Diameter Header: 275, PXY> //content of Diameter header: "275", the command code; "PXY", indicating the message is proxiable
 <Session-Id> //indicating the session identifier, which is a copy of the session identifier in the request
 {Result-Code} //having a value of "3006" which indicates a redirect response
 {Origin-Host} //the name of the host from which this response is returned
 {Origin-Realm} //the name of the realm from which this response is returned
 {Redirect-Host} //the name of the server to be redirected to, e.g., Server1.china.com In Step S03, the client sends a request to the server according to the address of server carried in the response from the redirect agent;

In Step S04, the server handles the request from the client and returns a response to the client.

In the above scheme, servers are managed on realm basis, and route data may be maintained centrally by the redirect agent without being maintained on multiple clients. The existing redirect agent can return the address of a server in the origin realm but can't return a new realm name; therefore, it can be redirected to a server in the current realm but can't be redirected to a server in a new realm. As shown in FIG. 1, both the redirect agent and the server have to be in the same realm: Realm1.com. That is because the routing method is carried as first, routing according to the information of the realm and then routing through the server in the realm. For example, when the client makes a routing in the realm China Mobile, it sends a message to the agent of the realm China Mobile according to the name of the realm (China Mobile); then, the agent in the realm China Mobile determines the service belongs to Beijing Mobile according to the server name.

In today's communication management, there often occur cases in which a client has to be redirected to other realms and servers. For example, an operator (with a realm name) may want to stop a service and hope all of his customers are redirected by a redirect agent to another operator (with another realm name) so as to continue the provision of the service without affecting the services for his customers. Because the existing redirect interface doesn't support redirection between different realms, all clients have to be upgraded so that the clients can send a request message to a new realm. That requires modifying the realm information originally configured on each client to information of the new realm. With the existing scheme, such an upgrade and maintenance will cause heavy workload, because there are usually a huge number of clients.

SUMMARY OF THE INVENTION

A method for redirecting a client, in which the client is directed to a first server in a first realm, includes: sending, by the client, a request message to a redirect agent; returning, by the redirect agent, a first response message to the client, wherein an identification of a second realm is carried in the first response message; sending, by the client, the request message to a second server in the second realm.

The method further includes: performing, by the second server, a corresponding operation according to the request message; returning, by the second server, a second response message.

The returning the first response message to the client further includes: determining, by the redirect agent, whether it is required to redirect the request from the client; if it is required, returning the first response message to the client.

In the method, the determining whether it is required to redirect the request from the client includes: determining whether it is required to send the request message to the second realm according to a destination realm and/or a destination host assigned in the request message.

The sending the request message to a second server in the second realm further includes: parsing, by the client, an address of the second server.

The parsing the address of the second server includes: parsing, by the client, the address of the second server directly, when the second server is connected to the client directly; searching, by the client, for an address of the next hop through the second realm and parsing, by another node, the address of the second server, when the second server is not connected to the client directly.

In the step of sending by the client the request message to a second server in the second realm, the second server is a server chosen by the client randomly in the second realm.

An identification of the second server is further carried in the first response message.

The messages are carried in Diameter protocol.

A system for redirecting a client, includes the client and a redirect agent which maintains route data for the client; the client includes a request message sending unit which is adapted to send a request message to a server; the redirect agent is provided with a request responding unit which is adapted to return a response message to the client which is directed to a first server in a first realm; the request responding unit includes a second realm identification configuring unit which is adapted to configure an identification of a second realm into the response message.

The request responding unit further includes a second server identification configuring unit which is adapted to configure an identification of a second server into the response message.

The client is provided with a server selecting unit which is adapted to choose the second server belonging to the second realm according to the identification of the second realm carried in the response message.

A redirect agent for redirecting a client, maintains route data for the client, receives a request message from the client, and is provided with a request responding unit adapted to return a response message to the client that is directed to a first server in a first realm, wherein the request responding unit comprises a second realm identification configuring unit which is adapted to configure an identification of a second realm into the response message.

A client capable of being redirected by a redirect agent, receives a response message from the redirect agent, and includes a request message sending unit that is adapted to send a request message to a server, wherein the client is provided with a server selecting unit which is adapted to choose a second server belonging to a second realm according to an identification of the second realm carried in the response message.

The solutions of the present invention provide the benefits as follows.

In the solutions of the present invention, the client can be redirected to a realm different from the current realm in the client redirection process.

In the solutions of the present invention, the data are maintained and modified only on the redirect agent, so that the redirection service between different realms can be realized without upgrading or maintaining the client.

In addition, in the solutions of the present invention, because the number of redirect agents is much smaller than the number of clients, the operation and maintenance costs can be reduced greatly.

DETAILED DESCRIPTION OF THE INVENTION

Hereunder embodiments of the present invention will be described in conjunction with the accompanying drawings.

In solutions of the present invention, a client is directed to a server in a realm. Data are maintained and modified on a redirect agent, and the redirect agent sends relevant configuration information and the data to the client. It is unnecessary to upgrade and maintain the client. In the embodiments, the information and data configured on the redirect agent may include information of a new realm to which the client is directed after the redirection, and may also include information of a server in the new realm; the above information may be sent to the client together or partly, so that the client may accomplish the redirection operation according to relevant technologies. Those embodiments are described hereunder in detail.

In an embodiment of the present invention, information of a new realm to which a client is to be redirected is configured on a redirect agent, and the information of the new realm is carried in a response message sent by the redirect agent to the client.

Figure 1:
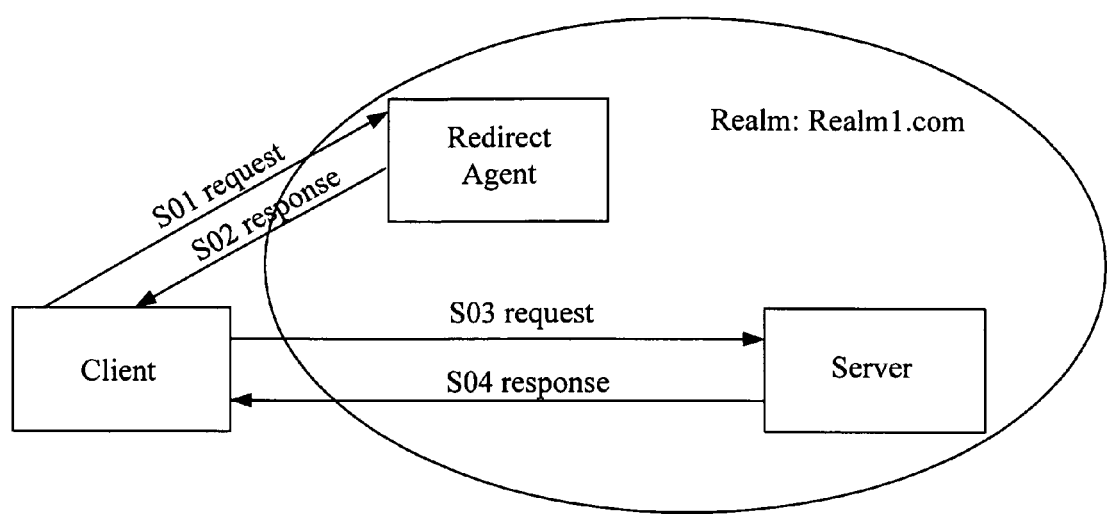
FIG. 1 is a schematic flow chart of client redirection in the prior art.
Figure 2:
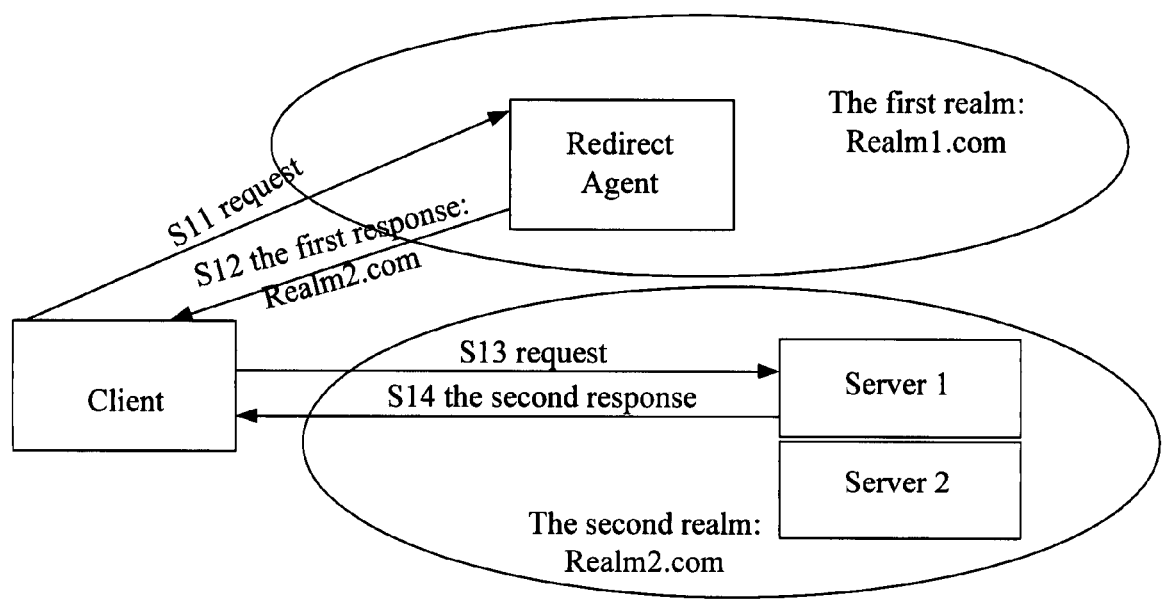
FIG. 2 is a schematic flow chart of client redirection according to an embodiment of the present invention.

As shown in FIG. 2, to redirect the client, the following steps may be performed.

In Step S11, the client sends a request message to the redirect agent.

The client sends a request message to the redirect agent that performs redirection data management for the client, to request for a service or operation.

The request message may be an ordinary service request message, that is, the request message may be initiated with an ordinary service request.

In Step S12, the redirect agent returns a response message to the client, with information of a second realm to which the client is to be redirected carried in the response message.

For example, when receiving the request message from the client, the redirect agent returns a response message, which carries the information of the second realm to be redirected to, to the client according to content of the request message. For instance, in this embodiment, the redirect agent returns the information of the second realm to be redirected to, i.e., Realm2.com.

In this step, when determining the request message has to be sent to a new destination realm according to relevant information in the request message, e.g., destination realm and/or address of destination host, the redirect agent returns a response message carrying information of the new destination realm to the client. When the client receives the response, it may reroute the message with the new destination realm.

For example, an exemplary content of a redirect response message for authorization and authentication is described as follows:

<AAA>::=<Diameter Header: 275, PXY> //content of Diameter header: "275", the command code; "PXY", indicating the message is proxiable
<Session-Id> //indicating the session identifier, which is a copy of the session identifier in the request {Result-Code} //having a value of "3006" which indicates a redirect response
{Origin-Host} //the name of the host from which this response is returned
{Origin-Realm} //the name of the realm from which this response is returned
{Redirect-Realm} //the name of the realm to be redirected to, e.g., Realm2.com In Step S13, the client sends the request message to a second server in the second realm to be redirected to.

When receiving the first response message, the client obtains the information of the second realm to be redirected to from the first response message, and sends the request message to the second server in the second realm according to the information of that new realm.

The request message in Step S13 is consistent with the request message in Step S11 in terms of content such as service information, except for the destination address being replaced.

Because the information of the second realm is provided but information of the server to which the client is to be redirected is not provided explicitly, the client takes the second realm to be redirected to as the destination realm for routing that request message. The request message may be handled by any server in the destination realm. The client may choose a server (here, choose between server 1 and server 2) randomly in the second realm, for example, the client chooses to initiate the request to server 1.

In the above process, the client is required to parse the address of server 1 as follows:

the client parses the address of server 1 directly in the case that server 1 is connected to the client directly;

the client searches for the address of the next hop through the second realm and the address of the server 1 is parsed by another node, in the case that server 1 is not connected to the client directly.

In this step, said another node is a message processing node which may be another server with address resolution function.

In Step S14, the second server in the second realm receives the request message from the client, performs a corresponding operation, and returns a second response message to the client.

The second server chosen by the client in the second realm performs relevant corresponding operation, for example, executing the request, or forwarding or redirecting the request to another server, according to the request message from the client, and returns the second response message to the client to inform the client of the execution result. The second server in the second realm may even perform redirection again on the request from the client.

In another embodiment of the present invention, on the basis of the previous embodiment, the information of the new realm to which the client is to be redirected is configured on the redirect agent; and additionally, information of a new server to which the client is to be redirected is configured on the redirect agent. In addition, the information of the new realm and the information of the new server are carried in the first response message to the client.

Figure 3:
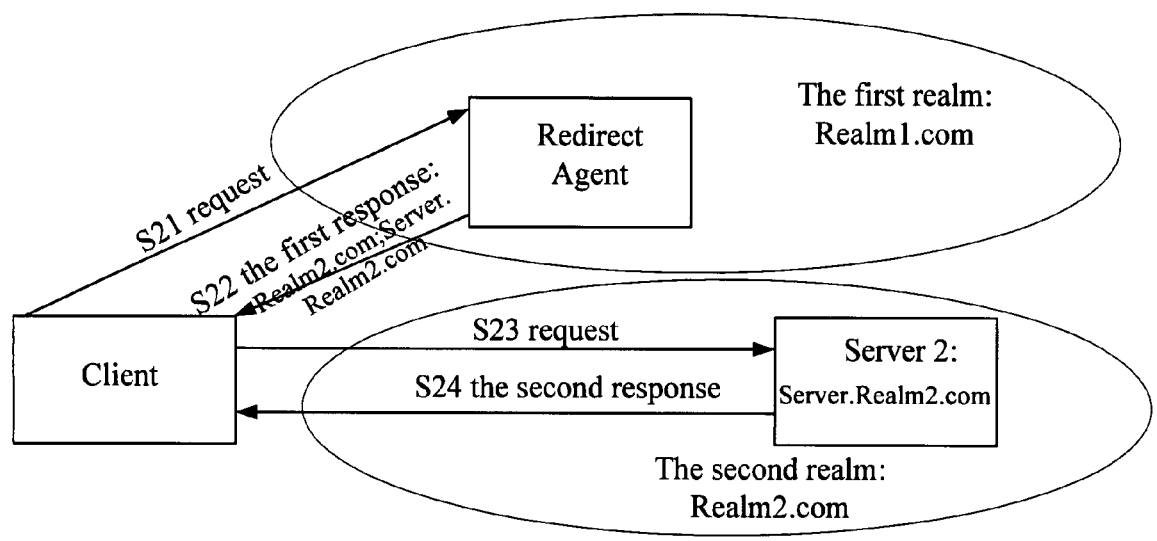
FIG. 3 is a schematic flow chart of client redirection according to another embodiment of the present invention.

FIG. 3 is a schematic flow chart according to the embodiment. As shown in FIG. 3, the redirection process includes the steps as follows.

In Step S21, the client sends a request message to the redirect agent.

The client sends the request message to the redirect agent that performs redirection data management for the client, to request for a service or operation.

In Step S22, the redirect agent returns a first response message to the client, to inform the client of information of the second realm to which the client is to be redirected and the address of the second server to which the client is to be redirected.

When receiving the request message from the client, the redirect agent returns the first response message, which carries the information of the second realm to be redirected to and the information of the second server to be redirected to, to the client according to the content of the request message.

For example, an exemplary content of a redirect response message for authorization and authentication is described as follows:

<AAA>::=<Diameter Header: 275, PXY> //content of Diameter header: "275", the command code; "PXY", indicating the message is proxiable
<Session-Id> //indicating the session identifier, which is a copy of the session identifier in the request
{Result-Code} //having a value of "3006" which indicates a redirect response
{Origin-Host} //the name of the host from which this response is returned
{Origin-Realm} //the name of the realm from which this response is returned
{Redirect-Host} //the name of the server to be redirected to, e.g., Server.Realm2.com
{Redirect-Realm} //the name of the realm to be redirected to, e.g., Realm2.com In Step S23, the client sends the request message to the second server according to the address of the second server and the information of the second realm carried in the first response from the redirect agent.

When receiving the first response message, the client obtains the information of the second realm to which the client is to be redirected from the first response message.

In the case that the address of the second realm to be redirected to and the address of the second server to be redirected to are provided together, the client takes the second realm to be redirected to as the destination realm and the second server to be redirected to as the destination server, and routes the request message to the assigned second server in the second realm. The request may only be handled by the destination second server in the second realm.

In Step S24, the second server in the second realm receives the request message from the client and performs a corresponding operation, for example, executing the request, or forwarding or redirecting the request to another server according to the request. Then the second server returns a second response message to the client.

The second server performs the corresponding operation according to the request message from the client, and according to a result of the operation, returns the second response message to the client to inform the client of the operation result. The second server in the second realm may even perform redirection again on the request from the client.

According to an embodiment of the present invention, an extended redirect realm parameter of Diameter protocol is in a format as follows:

Redirect Realm: type: DiameterIdentify (Diameter identification), containing an identification of a new realm to be redirected to.

If a redirect request requests to be redirected to the same realm, this "Redirect Realm" needn't be provided. AVP Code: to be assigned by the standardization organization. AVP Flag: the "M" flag is required, i.e., the AVP is a parameter that must be comprehended.

An exemplary content of a redirect response message for authorization and authentication is described as follows:

<AAA>::=<Diameter Header: 275, PXY> //content of Diameter header: "275", the command code; "PXY", indicating the message is proxiable
   <Session-Id> //indicating the session identifier, which is a copy of the session identifier in the request
   {Result-Code} //having a value of "3006" which indicates a redirect response
   {Origin-Host} //the name of the host from which this response is returned
   {Origin-Realm} //the name of the realm from which this response is returned
   [Redirect-Host] //the name of the server to be redirected to, e.g., Server1.china.com
   {Redirect-Realm}//the name of the realm to be redirected to, e.g., china.com The code format of Redirect-Realm may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            AVP Code                           |
+-+-+-+-+-+-+-+-+-+-+-+-+-+-+-+-+-+-+-+-+-+-+-+-+-+-+-+-+-+-+-+-+
| V M P r r r r r |                 AVP Length                  |
+-+-+-+-+-+-+-+-+-+-+-+-+-+-+-+-+-+-+-+-+-+-+-+-+-+-+-+-+-+-+-+-+
|  Data ...
+-+-+-+-+-+-+-+-+
```

AVP Code: to be allocated by the standardization organization.
AVP Falg:
V: 0
M: 1
P: 0
r: 0
AVP Length: the length of the parameter, to be filled as required.
Data: filled with the name of the realm to be redirected to.

The parameter is provided in the redirect response to the Diameter request in the case that the Diameter request is to be redirected to a new realm.

Figure 4:
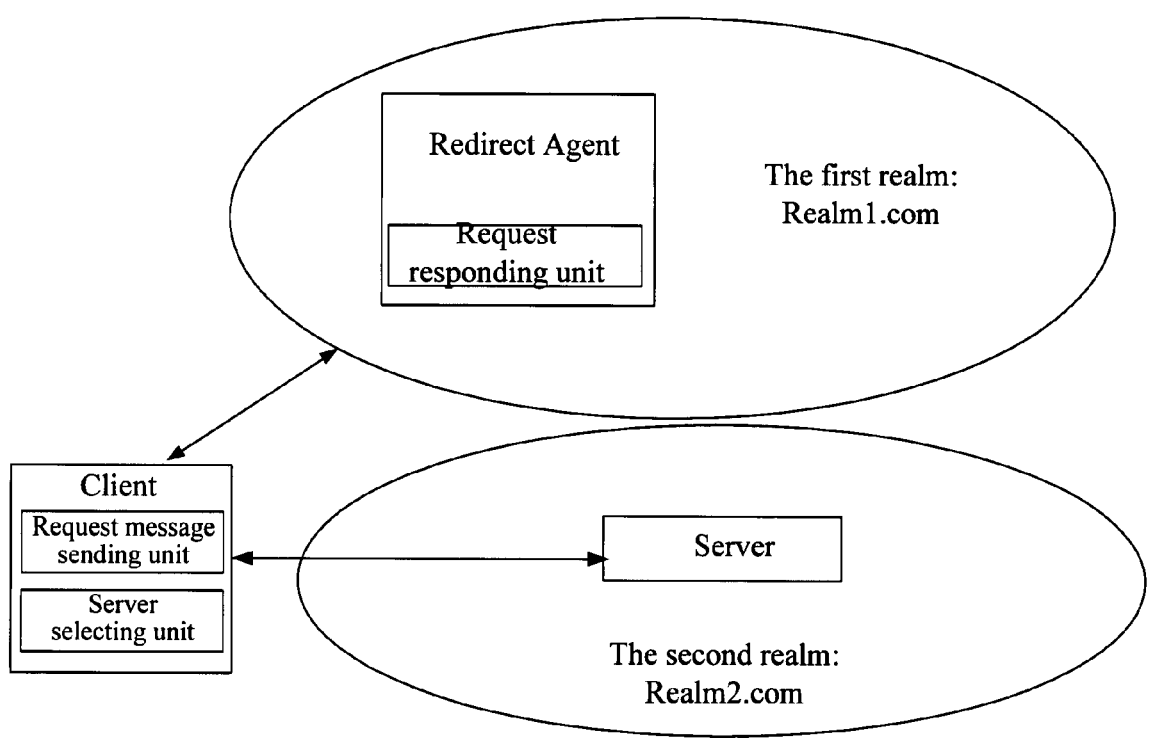
FIG. 4 is a schematic structure diagram of a system according to an embodiment of the present invention.

FIG. 4 is a schematic structure diagram of a system for redirecting a client according to an embodiment of the present invention. As shown in FIG. 4, the system mainly includes a client, a redirect agent that maintains route data for the client, and a server to which the client is directed. The client includes a request message sending unit which is adapted to send a request message to the servers. The redirect agent is provided with a request responding unit which is adapted to return a response message to the client who is directed to a first server in a first realm.

According to an embodiment of the present invention, a second realm identification configuring unit and a second server identification configuring unit are added into the request responding unit to configure relevant redirection information for the client.

Figure 5:
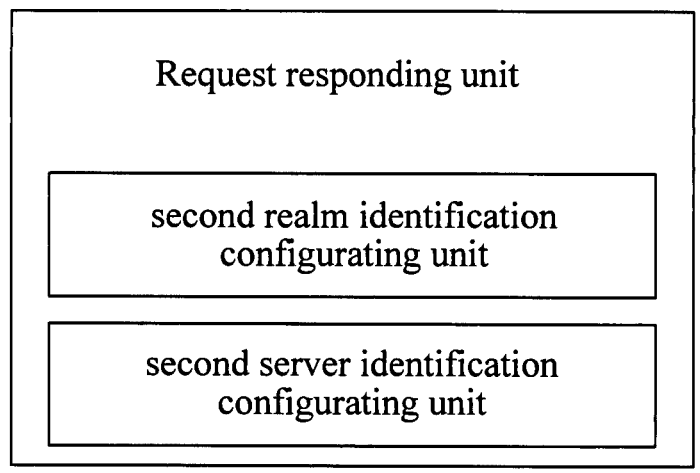
FIG. 5 is a detailed schematic structure diagram of a request responding unit in a redirect agent of a system according to an embodiment of the present invention.

FIG. 5 illustrates a detailed structure of the request responding unit according to an embodiment of the present invention. As shown in FIG. 5, the request responding unit is added with a second realm identification configuring unit, adapted to configure an identification of a second realm into the response message and a second server identification configuring unit, adapted to configure information of a second server into the response message.

The client is provided with a server selecting unit which is adapted to choose a second server in the second realm according to the identification of the second realm carried in the response message.

In the case that the request responding unit doesn't include the second server identification configuring unit, the identification of the second realm is presented in the response message returned to the client, but the identification of the second server is not presented. In such case, it is required to arrange a server selecting unit in the client for choosing a second server in the second realm so as to initiate the redirect request to the second server.

In the embodiments of the present invention, the data are maintained and modified only on the redirect agent, so that the redirection service between different realms may be realized without upgrading or maintaining the client.

In addition, in the embodiments of the present invention, because the number of redirect agents is much smaller than the number of clients, the operation and maintenance costs may be reduced greatly.

It is apparent that various modifications and variations may be made to the present invention by those skilled in the art, without departing from the spirit and the scope of the present invention. The present invention tends to cover the modifications and variations if those modifications and variations fall into the protected scope of the present invention defined by the accompanied claims or their equivalent.

What is claimed is:

1. A method for redirecting a client comprising:
   sending, by the client, a request message to a redirect agent, wherein the client is directed to a first server in a first realm;
   receiving, by the client, a first response message from the redirect agent, wherein an identification of a second realm is carried in the first response message, wherein the second realm has a plurality of servers, and wherein the identification of the second realm is set in a redirect field of the first response message received by the client from the redirect agent;
   randomly choosing, by the client, a second server in the second realm according to the identification of the second realm set in the redirect field of the first response message; and
   sending, by the client, the request message to the second server in the second realm.

2. The method according to claim 1, further comprising:
   performing, by the second server, a corresponding operation according to the request message; and
   returning, by the second server, a second response message.

3. The method according to claim 1, further comprising:
   determining, by the redirect agent, whether the redirect agent is required to redirect the request message from the client; and
   returning the first response message to the client based at least in part on a determination that the redirect agent is required to redirect the request message from the client.

4. The method according to claim 3, wherein determining whether the redirect agent is required to redirect the request message from the client comprises determining whether the redirect agent is required to send the request message to the second realm according to at least one of a destination realm and a destination host assigned in the request message.

5. The method according to claim 1, wherein sending the request message to the second server in the second realm further comprises parsing, by the client, an address of the second server.

6. The method according to claim 5, wherein parsing the address of the second server comprises parsing, by the client, the address of the second server directly, when the second server is directly connected to the client.

7. The method according to claim 5, wherein parsing the address of the second server comprises:
   searching, by the client, for an address of a next hop through the second realm; and
   parsing, by another node, the address of the second server, when the second server is not directly connected to the client.

8. The method according to claim 1, wherein an identification of the second server is carried in the first response message.

9. The method according to claim 1, wherein the request message and the first response message are carried in a Diameter protocol.

10. A system for redirecting a client comprising:
   a client having a processor configured to send a request message to a server, wherein the client is directed to a first server in a first realm; and
   a redirect agent having a processor configured to maintain route data for the client, configure an identification of a second realm into a response message, and return the response message to the client, wherein the second realm has a plurality of servers, and wherein the identification of the second realm is set in a redirect field of the response message returned by the redirect agent to the client, and
   wherein the client further comprises a server selecting unit configured to choose a second server belonging to the second realm according to the identification of the second realm set in the redirect field of carried in the response message.

11. The system according to claim 10, wherein the redirect agent further comprises a server identification configuring unit configured to configure the identification of the second server into the response message.

12. A client for being redirected by a redirect agent comprising:
   a processor configured to request the redirect agent to assign a different server in a new realm for the client;
   a request message sending unit configured to send a request message to the redirect agent in a first realm and receive a response message from the redirect agent, wherein the response message carries an identification of a second realm, and wherein the identification of the second realm is set in a redirect field of the response message received by the client from the redirect agent; and
   a server selecting unit configured to randomly choose a server belonging to the second I realm according to the identification of the second realm set in the redirect field of carried in the response message, wherein the second realm includes a plurality of servers.

13. A method for redirecting a client that is used to request a redirect agent to assign a different server in a new realm for the client, the method comprising:
   receiving, by the redirect agent, a request message from the client, wherein the client is directed to a first server in a first realm;
   determining, by the redirect agent, whether the redirect agent is required to redirect the request message from the client;
   returning a first response message to the client based at least in part on a determination that the redirect agent is required to redirect the request message from the client, wherein an identification of a second realm is carried in the first response message, wherein the second realm has a plurality of servers, and wherein the identification of the second realm is set in a redirect field of the first response message returned from the redirect agent to the client;
   randomly choosing, by the client, a second server in the second realm according to the identification of the second realm set in the redirect field of the first response message; and
   sending, by the client, the request message to the second server in the second realm.

14. The method according to claim 13, wherein determining whether the redirect agent is required to redirect the request message from the client comprises determining whether the redirect agent is required to send the request message to the second realm according to at least one of a destination realm and a destination host assigned in the request message.

15. The method according to claim 13, wherein the request message and the first response message are carried in a Diameter protocol.

* * * * *